Feb. 5, 1935.   O. R. SCHOENROCK   1,990,209
TRACTOR
Filed Aug. 26, 1929   6 Sheets-Sheet 2
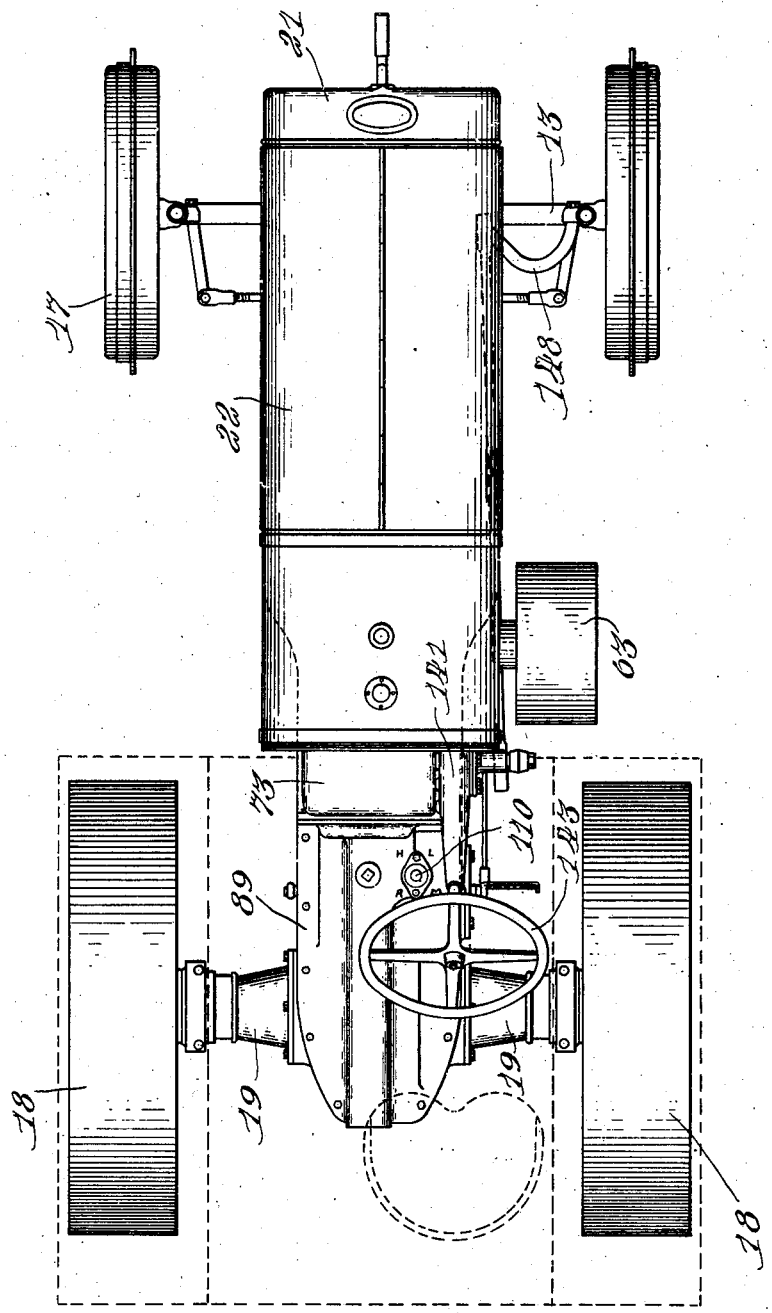
Inventor.
Otto R. Schoenrock.
By John P. Smith
Atty.

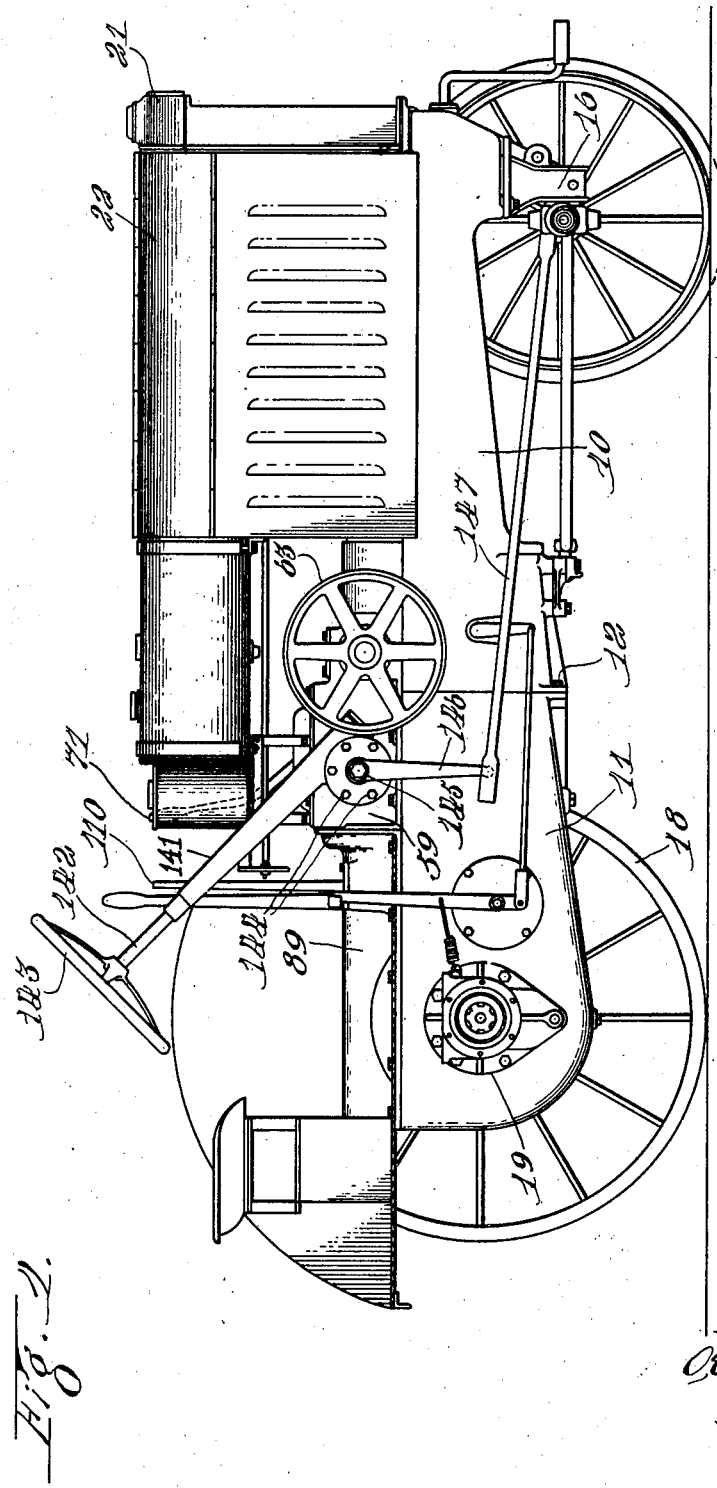

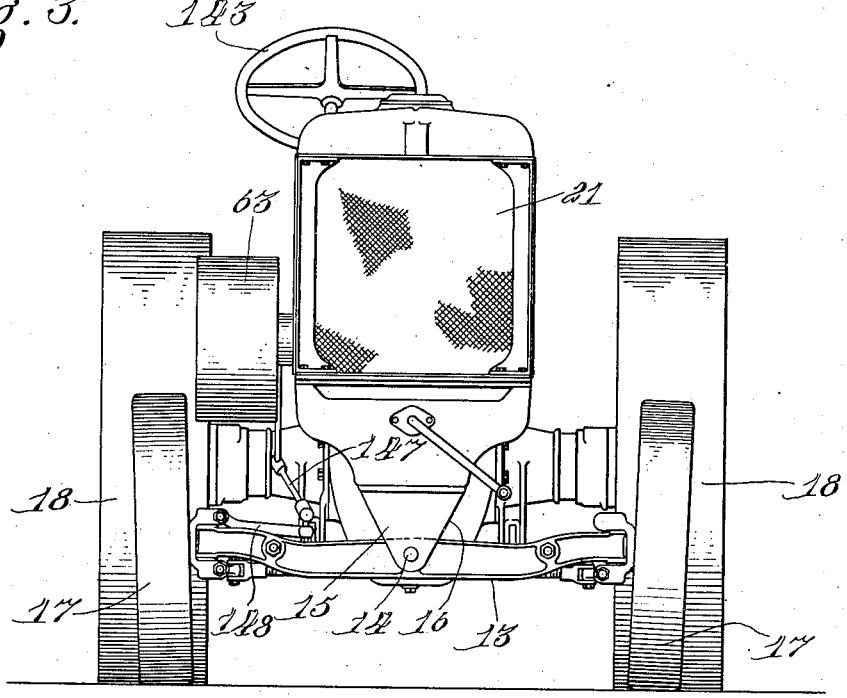
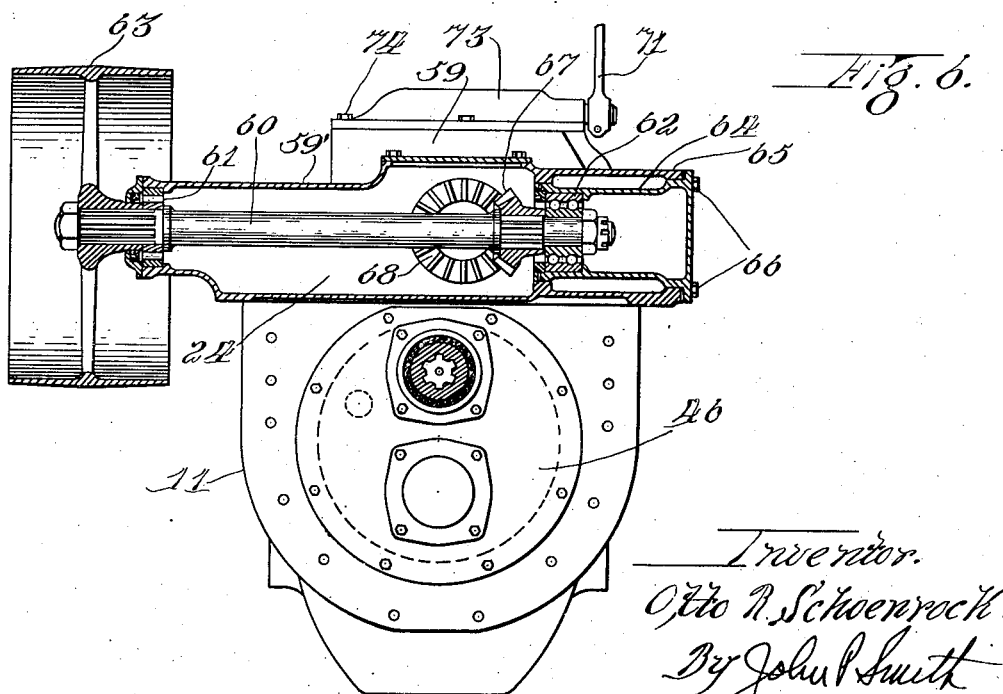

Feb. 5, 1935. O. R. SCHOENROCK 1,990,209
TRACTOR
Filed Aug. 26, 1929 6 Sheets-Sheet 4

Fig. 2.

Inventor.
Otto R. Schoenrock.
By John P. Smith
Atty.

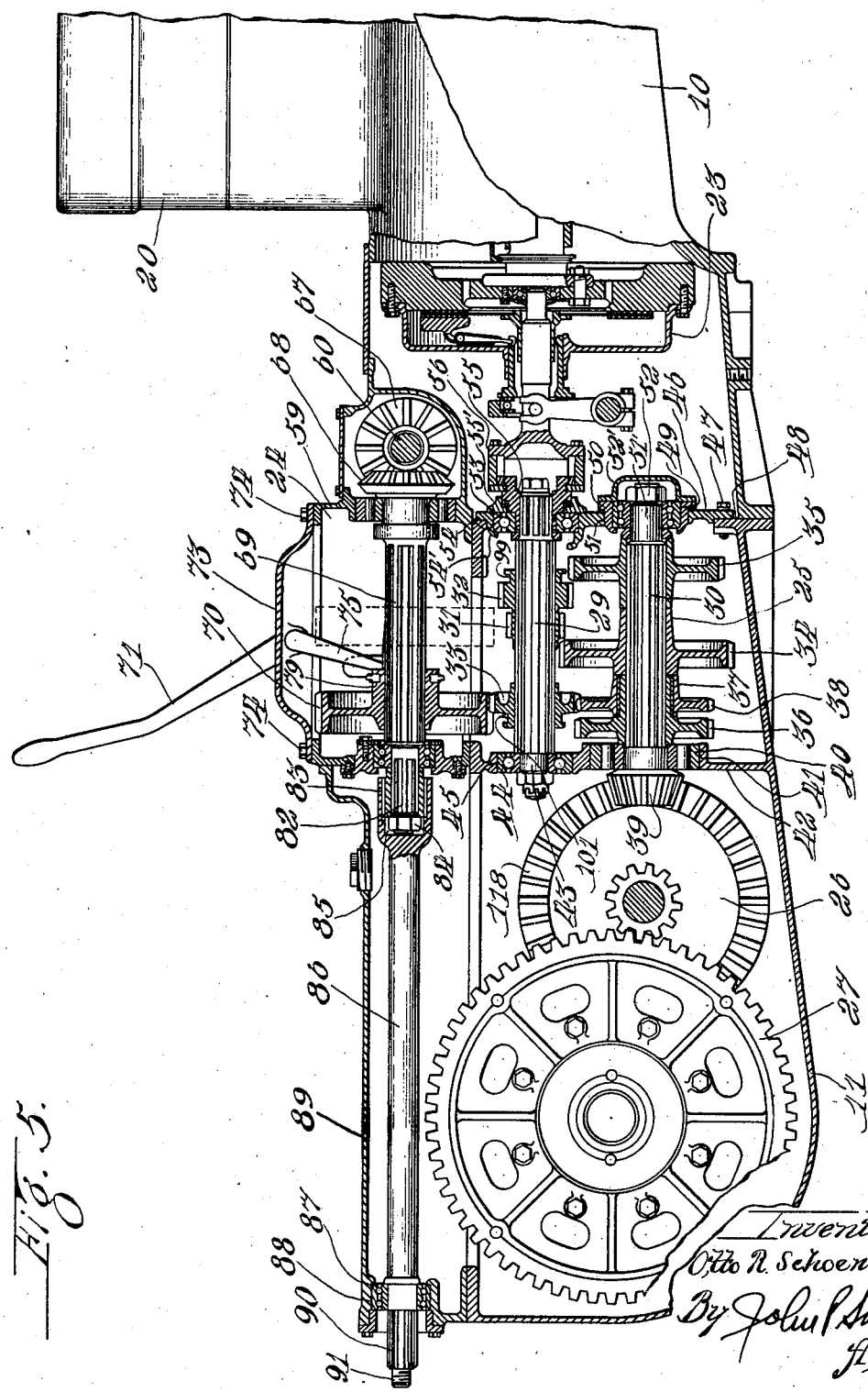

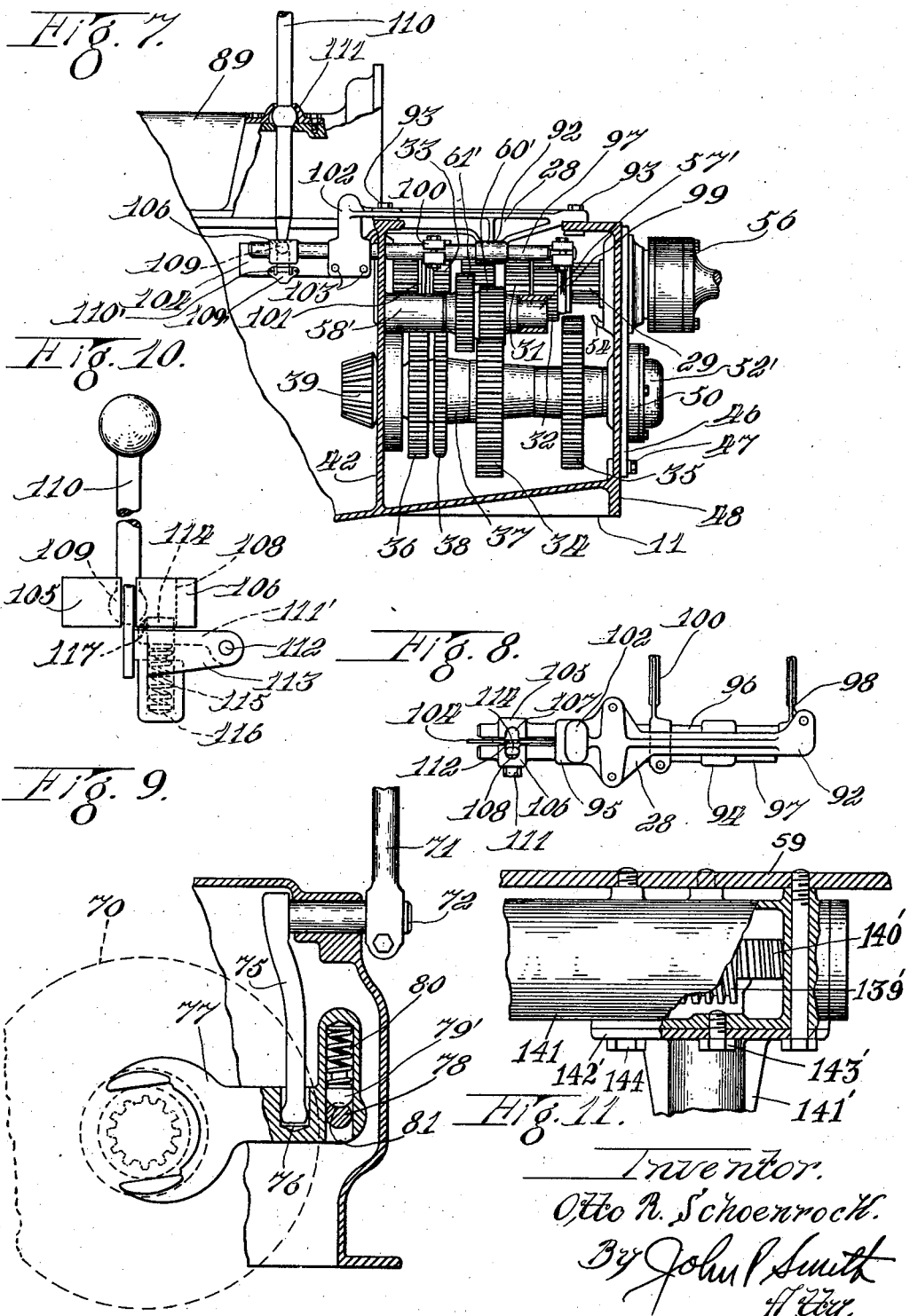

Patented Feb. 5, 1935

1,990,209

UNITED STATES PATENT OFFICE 1,990,209

TRACTOR

Otto R. Schoenrock, Chicago, Ill., assignor to Oliver Farm Equipment Company, a corporation of Delaware Application August 26, 1929, Serial No. 388,302

11 Claims. (Cl. 180—70)

The present invention relates to tractors and more particularly, to tractor construction in which the different parts thereof are assembled in separate and distinct units and the units brought together to form the complete tractor.

The primary object of the present invention is to provide a tractor construction in which individual units are assembled separately and brought together to complete the tractor so as to expedite the manufacture and assembly of the tractor whereby the increase of production may be raised to a maximum.

A further object of the invention is to provide a novel construction of a removable plate secured to an internal flange formed in the tractor frame so that the main and supplemental transmission shafts may be removed or replaced without the necessity of separating or dismantling the front and rear main frame sections of the tractor frame.

Another object of the invention is to provide a tractor in which all the operating parts thereof are readily accessible for necessary adjustment or replacement.

A further object of the invention is to provide a tractor or motor vehicle in which the operating parts are assembled in distinct units and in which the renewal or assembly of these units in the completion of the tractor, may be accomplished by one man without any assistance and without, in most cases, disturbing the adjustment of other parts or units.

A still further object of the invention is to provide a tractor in which the operating parts thereof, including the braking mechanism for the tractor, are completely housed so as to protect the same from dust and dirt.

A further object of the invention is to provide a novel assembly of the steering post construction in which the same cap screws hold a steering worm wheel bearing and steering gear housing against the pulley carrier assembly. In this steering post assembly, the proper meshing of the worm and worm wheel is accomplished by having the center hole eccentric with the bolt circle.

A still further object of the invention is to provide a tractor having a power drive for the driving of other implements in which the drive shaft is so associated with the transmission mechanism that the drive shaft is only operatively connected with the transmission mechanism when the tractor is being propelled at certain speeds so as to render the power drive inoperative for preventing injury to the implement from being driven in excessive speeds or in a reverse direction.

These and other objects are accomplished by providing a construction and arrangement of the various parts in the manner hereinafter described and particularly pointed out in the appended claims.

Referring to the drawings, Fig. 1 is a side elevational view of my improved tractor construction with one of the rear traction wheels and one of the front steering wheels removed;

Fig. 2 is a top plan view of the same;

Fig. 3 is a front elevational view of my improved tractor;

Fig. 4 is a fragmentary top plan view of the frame structure of the tractor showing a portion of the transmission and rear axle construction in cross-section;

Fig. 5 is a fragmentary cross-sectional view taken on a vertical plane passing through the longitudinal center of the rear end of the tractor showing an arrangement of the driving mechanism and transmission of the tractor;

Fig. 6 is a front elevational view of the front end of the transmission housing showing the power take-off housing unit in cross section and the manner in which the same is mounted on the transmission housing;

Fig. 7 is a fragmentary cross-sectional view of the transmission housing showing the manner in which the gear shift mechanism is mounted therein;

Fig. 8 is a top plan view of the gear shifting supporting bracket;

Fig. 9 is an enlarged fragmentary partially cross-sectional view of the shifting mechanism for the power take-off;

Fig. 10 is a detailed end elevational view showing a locking mechanism for one of the gear shifter rods, and Fig. 11 is a detailed and partly sectional view of the steering post assembly showing the manner in which certain of the bolts extend through the housing for securing the steering post assembly to one side of the belt pulley assembly housing.

My improved tractor construction comprises a frame structure which consists essentially of a front engine supporting section 10 and a rear axle and transmission housing section 11, which are preferably bolted together by a plurality of bolts as shown at 12. The front end of the tractor is supported on a transverse axle 13 which is pivotally connected by means of a pin 14 to a depending flange 15 of a bracket 16 secured to the forward end of the front section 10 of the main frame. This axle is provided with the two usual steering wheels 17. The rear end of the tractor is supported on rear supporting traction wheels 18, which in turn, are secured to the respective rear axle sections 19.

Mounted on the frame of the tractor are the engine 20, a radiator 21, an engine hood 22 covering the engine, a clutch mechanism 23, a belt pulley drive and power take-off assembly 24, a transmission 25, bull gear pinion and brake drum mechanism assembly 26, and a bull gear 27 carrying the differential and driving the rear axle of the tractor. The radiator, hood and engine may be of any suitable construction and per se form no part of the present invention, being shown merely to complete the illustration. It will be noted from the drawings that the belt pulley drive and longitudinal shaft operatively drives the same as well as the bull pinion and brake drum mechanism together with the differential mechanism are separate and distinct units which may be assembled in the tractor or removed therefrom as a whole. It will also be noted that the rear axle, together with the gear 27, has a differential mechanism mounted therein; and a steer-assembly hereinafter described, as well as the gear shifting unit 28, also constitutes separate units that may be assembled or removed from the tractor without removing or disturbing the other parts. The construction of these units so that they may be easily mounted in assembling the complete tractor on the frame constitutes the principal part of the present invention.

In the following, I have described the tractor construction or more particularly, the units which make up the tractor construction separately and the relation each unit bears to the others.

Transmission mechanism

The transmission mechanism generally indicated by the reference character 25 comprises essentially a main transmission shaft 29 and a supplemental transmission shaft 30. (See Figs. 4, 5 and 7.) The shaft 29 is a splined shaft and is provided with change speed pinion 31 for effecting a propulsion of the tractor in low gear and which in turn, is formed integrally with pinion 32 for effecting the propulsion of the tractor in second speed. Mounted on the splined shaft 29 is also a third or high speed gear 33. The supplemental transmission shaft 30 is likewise a splined shaft to which are secured first speed transmission gear 34 which is adapted to mesh with the pinion 31 when the latter is shifted into its proper operative relation with respect to the gear 34. Also, secured to the supplemental shaft 30 is a second transmission gear 35 which is adapted to mesh with and be operatively driven by the gear 32 for propelling the tractor in second speed. Secured to the supplemental transmission shaft 30 is a third gear 36 which is adapted to be meshed with the gear 33 on the main transmission shaft 29 for propelling the tractor at high speed. The gear 36 is provided with a laterally extending finished collar or bearing portion 37 on which is journaled an idle or lubricant elevating gear 38 which operates in the manner well understood in the art. Secured to the rearward end of the supplemental transmission shaft 30 is a beveled pinicn 39. The lower supplemental transmission shaft 30 is journaled in a suitable roller bearing 40 mounted in a bore 41 formed in the transverse partition wall 42 which divides the rear part of the transmission casing of the tractor into two compartments. The rearward end of the main transmission shaft 29 is reduced as shown at 43 and journaled in a suitable ball bearing 44 mounted in a bore 45 located in the partition wall 42 directly above the supplemental transmission shaft. Each of the gears on the respective main and supplemental transmission shafts 29 and 30, respectively, are assembled thereon with the rearward ends positioned in their respective anti-friction bearings at which time a removable disc-like plate 46 is secured by means of bolts 47 to the inwardly extending circular flange 48 formed on the forward part of the rearward tractor frame section 11 at the point where the front and rear frame sections 10 and 11 of the tractor, are secured together. At the time this plate is being secured, anti-friction bearing 49 is seated in a sleeve 50 which in turn is mounted in the bore 51 formed in the plate 46. The anti-friction bearing 49 is secured to the forward and reduced end of the shaft 30 as shown at 51', by means of a nut 52, which is secured to the threaded extension of the shaft. In order to prevent lubricant from getting into the clutch housing, a suitable cap 52' is secured to the sleeve 50. The forward end of the main transmission shaft 29 is journaled in an anti-friction bearing 53 which in turn, is mounted in a bore 54 in the disc or plate 46. This bore is surrounded by a suitable retaining flange 54' which supports and retains the anti-friction bearing 53 therein. The inner race and anti-friction bearing 53 is mounted on a sleeve 55 of a coupling member 56. The anti-friction bearing is retained in the plate 46 by a collar 55', secured to said plate.

This arrangement of providing a removable plate for forming and supporting the forward bearings of the main and supplemental transmission shafts 29 and 30 respectively, permits these shafts to be mounted or removed therefrom without the necessity of disconnecting the front frame section 10 from the rear frame section 11, as is required in many tractors, heretofore constructed. In other words, if removal of the transmission shafts 29 and 30 are required, the coupling member 56 is disconnected and the plate 46 unbolted and moved forwardly so as to permit readily removal of these shafts through the openings in the main frame of the tractor as seen in Figs. 4 and 5 of the drawings. This may be accomplished without disconnecting the rear frame section 11 from the front frame section 10. In a similar or reversal of these operations the transmission shafts may be replaced or assembled without separating the frame sections. It will also be pointed out that one man may perform these operations without any additional assistance.

The reverse gear shaft 57' is secured in a forwardly extending arm 58' formed integrally with the transverse partition wall 42 while the forward end of the shaft is supported in a laterally extending support 59' formed integrally with the side wall of the tractor frame portion 11. (See Figs. 4 and 7.) Journaled on the shaft 57' is a pinion 60' which meshes with and is operatively driven by the gear 34 on the supplemental transmission shaft 30. Formed integrally with the pinion 60' is a relatively larger gear 61' which is adapted to mesh with the change speed gear 33 when the latter gear is shifted longitudinally into engagement with the gear 61'.

The main transmission shaft 29 is connected through a coupling 57 with a clutch mechanism generally indicated by the reference character 58 which in turn, is connected in a manner well understood with the crank shaft of the engine 20, as clearly shown in Fig. 5.

Belt pulley drive

The belt pulley driving mechanism, as clearly illustrated in Figs. 5 and 6 of the drawings, comprises essentially, a removable unit in the form of a housing 59 which is adapted to be bolted to the top of the rear frame section 11, directly above the transmission mechanism, as clearly shown in Fig. 5. This removable power take-off housing is provided with a transversely extending substantially tubular portion 59' in which is mounted a belt pulley shaft 60 which in turn is journaled in suitable anti-friction bearings 61 and 62. (See Fig. 6.) The outer end of the shaft 60 is provided with a belt pulley 63. The inner anti-friction bearing is mounted in a removable sleeve 64 which is adapted to be telescopically mounted in a tubular extension 65 of the transverse portion 59' of the belt pulley housing. This sleeve is secured thereto by means of bolts 66. Secured to the inner end of the shaft 60 is a beveled gear 67 which in turn, meshes with and is operatively driven by a second beveled gear 68. This gear 68 is secured to the forward end of a longitudinal extending supplemental belt pulley drive shaft 69. This belt pulley drive shaft 69 is preferably splined and has slidably mounted thereon, a large spur gear 70 which is adapted to be shifted longitudinally into and out of meshing relation with the change speed gear 33 on the main transmission shaft 29 by means of a manually operable lever 71 which is secured to a stub shaft 72 pivotally mounted in a removable cover 73. (See Figs. 5 and 9.) This cover 73 is secured to the top of the belt pulley housing by means of bolts 74. The inner end of this stub shaft 72 is provided with a depending crank arm 75 which has its lower or free end engaging a socket 76 formed in the upper side of a shiftable fork 77. This shiftable fork 77 is slidably mounted on a longitudinal rod 78. The outer or spaced apart ends of the fork 77 engage a peripheral groove 79 in a forwardly extending part of the hub of the gear 70. The gear 70 is locked in various positions of adjustment by means of a spring pressed semi-circular lug 79 which is reciprocally mounted in an upwardly extending socket 80 formed as an integral part of the fork member 77. This lug 79' is adapted to engage a plurality of spaced apart notches 81 formed in the rod 78 for frictionally locking the shiftable gear 70 in its operative or meshing relation with the transmission gear 33 or in its inoperative position, as shown in dotted lines in Fig. 5.

The rear end of the longitudinally extending supplemental drive pulley shaft 69 is provided with a splined portion 82 to which is secured a non-circular member 83 secured thereto by a nut 84. Telescopically mounted on a non-circular member through a socket 85 formed on the forward end thereof, is a power take-off shaft 86 for the driving of other implements. The rearward end of this power take-off shaft is journaled on an anti-friction bearing 87 which is mounted in a sleeve or aperture 88 formed in a cover or housing 89 which covers the rear end of the differential and rear housing construction 11 of the tractor. The rear end of this power take-off shaft is provided with a splined end 90 and a threaded extension 91 so as to permit the same to be readily connected for the purpose of operatively driving other implements attached to or drawn at the rear end of the tractor.

*Gear shift mechanism*

Another essential feature of the present invention is the provision of a novel assembly of a gear shifting mechanism which is adapted to be bolted to the frame of the tractor as a unit in which all of the movable parts are mounted therein for shifting and locking the gears of the transmission in various adjusted positions and to prevent them from becoming accidentally disengaged after once they have been shifted. This mechanism comprises a longitudinally extending bracket 92 secured to the main frame section 11 directly over and to one side of the transmission mechanism by means of bolts 93. (See Figs. 5, 7, and 8.) This bracket 92 is provided with two depending and horizontally disposed bearing portions 94 and 95 which have corresponding aligned apertures for receiving two oppositely arranged reciprocable gear shifter rods 96 and 97. Secured to the shifter rod 96 and at the forward end thereof, is a shifter fork 98 which is adapted to engage a peripheral groove 99 formed in the hub of the gear 32. Secured to the shifter rod 97 at a point intermediate its ends is a shifter fork 100 which is adapted to engage a peripheral groove 101 formed in one side of the hub of the transmission gear 33 for shifting the gear longitudinally on the main transmission shaft 29. These gear shifter rods 96 and 97 are locked by spring pressed members of the conventional type which are mounted in the depending portion 102 formed integrally on the rear end of the bracket 97. These spring pressed members engage notches in the gear shifter rods for frictionally locking them in various positions of adjustment in the manner well understood in the art. Secured to the lower end of the depending portion 102 by means of bolts 103 is a flat rearwardly extending plate 104 which extends between the rear end of the gear shifter rods 96 and 97, as clearly shown in Figs. 7 and 8. The rearward ends of these shifter rods 96 and 97 are provided with enlarged portions as shown at 105 and 106. These enlarged portions 106 are provided with adjacent normally registering semi-circular sockets 107 and 108 respectively, which are adapted to receive in engagement therewith, a ball 109 formed on the lower end of the gear shaft lever 110 which in turn is oscillatably mounted by a ball and socket joined, as shown at 111 formed in the cover 89 of the rear housing or frame. The plate 104 is provided with a transverse notch 112 on the upper edge thereof, which is adapted to register with the two sockets 107 and 108 when the shifter rods 96 and 97 are in their neutral position or more correctly, when the gears are shifted to their neutral position.

In order to more positively lock the gear shifting mechanism in its neutral position and prevent the change speed gears from being shifted accidentally when the power take-off gear 70 is thrown into meshing relation with the change speed gear 33, I have provided a positive lock which comprises a bracket 109' which is secured by means of bolts 110' to the plate 104 directly below the notch 112 in the plate 104. Mounted in the bracket 109' is a spring actuated pawl 111 pivoted on a pin 112 mounted in two laterally extending ears 113 formed on the bracket 109'. The free end of the pawl 111' is provided with an upwardly projecting lug 114 which is adapted to engage a semi-circular socket 108 of the shifter rod 97 for locking the rod against longitudinal movement as is clearly shown in Fig. 10 of the drawings. The free end of the pawl 111' is normally pressed upwardly by a compression spring 115 mounted in a socket 116 formed in the bracket 109'. The inner end of the pawl 111 and more particularly, the lug 114 is beveled, as shown at 117, so that the ball 109 of the gear shift lever 110 may depress the lug 114 of the pawl 111' and unlock the pawl 111' from the shifter rod 96 when the shifting lever 110 is swung in position for the purpose of shifting certain of the transmission gears longitudinally on the shaft.

*Brake shaft assembly and rear axle construction*

Referring to Figs. 4 and 5, the beveled pinion 39, meshes with and operatively drives a beveled gear 118. The gear 118 is a ring gear made separately and secured to a flange 119 formed on the brake drum shaft 120. Secured to the same flange 119 by means of rivets 121 which form the securing means for the beveled ring gear 118, is a brake drum 122 secured thereto. Formed integrally with the brake drum shaft 120 is a bull pinion gear 123. The outer ends of the shaft 120 are supported in suitable roller bearings 124 through the medium of bearing supporting cages 125 which are seated in flanged apertures 126 formed on the opposite side of the frame. These cages 125 are secured to the frame by means of bolts 127. Surrounding the brake drum 122 is a brake band 128 of the conventional construction which is adapted to engage the brake drum and manipulated by a lever mechanism of any well known construction. From the above description, it will be readily seen that by forming the flange 119 integrally with the shaft so as to permit the brake drum and the beveled gear 118 to be secured thereto, a convenient and compact assembly is provided. Also, by forming the bull pinion 123 as an integral part of the shaft 120, the assembly of these parts into a single unit provides a construction which simplifies the assembly or removal of these parts without disturbing the other parts of the tractor.

Meshing with the bull pinion 123 is a bull gear 129 which has its hub thereof, suitably recessed as shown at 130, and supporting therein and retaining, the differential mechanism clearly shown in Fig. 4 of the drawings. Secured to the bull gear 129 is a drum 131 which likewise, is provided with a recess for accommodating the differential gearing and supporting it between bull gear and the drum. Extending laterally with and formed as an integral part of the drum 131 is a collar or sleeve 132 on which is mounted roller bearing 133 to form two inner bearing supports for one of the rear axle sections 19. Mounted in suitable openings on the opposite sides of the main frame section 11 are axle carrying members 134 which are secured to the frame of the tractor by means of machine screws 135. Formed on the outer end of the axle carriers 134 are suitable sleeves 136 which are adapted to accommodate anti-friction bearings 137 for forming the outer bearing for the axle section 19. These two anti-friction bearings are held from lateral displacement by means of a peripheral flange 138 which is positioned between the two anti-friction bearings. The outer bearing and axle is retained within the axle support by a collar 139 secured to the axle support 134 by means of bolts 140. The outer end of the axle section has secured thereon, the usual traction wheel 18.

*Steering post assembly*

The steering post assembly is so constructed that the same cap screws which hold the steering worm wheel bearing to the steering gear housing, also secures the complete assembly to the belt pulley housing. This steering assembly comprises a steering post 141, the usual steering shaft 142, and steering wheel 143. Secured to the lower end of the shaft 142 is a worm 139' which meshes with and operatively drives a worm wheel 140' which in turn, is secured to the shaft 145. The shaft 145 is mounted in a bearing bracket 141' which in turn is provided with a flat annular flange 142' by means of which the bolts 144 which extend through the flange 142' and through the worm wheel housing for securing the steering post assembly to the side of the belt pulley drive housing 59, as clearly shown in Fig. 11. The worm wheel shaft 145 as well as its bearing 141' is secured to the worm wheel housing by means of a relatively short machine bolt 143' for the purpose of assembling these parts prior to mounting the complete assembly on the side of the tractor. Secured to the outer side of the shaft 145 is a depending crank 146 which in turn is connected to a ball and socket connection by means of a connecting rod 147 to the crank arm 148 of the front steering mechanism.

From the above description, it will be seen that I have pointed out in detail the construction of the various units which may be assembled separately and brought together for the purpose of assembling the complete tractor so that the tractor may be produced on a production scale and the amount of labor and material reduced to a minimum. It will be further pointed out that the construction and the arrangement of the units which go to make up the tractor are so related with respect to each other that a minimum amount of labor is required to replace or assemble the respective units and that in most cases, the units may be removed from the tractor without disturbing the other units. It is further pointed out that the main transmission shaft and the supplemental shaft may be removed or replaced without the necessity of separating the front and rear frame sections of the tractor frame. This is accomplished by merely removing the divisional plate between these two frame sections.

While in the above specification, I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. In a tractor, a main frame having a front and rear section, flanges formed on the adjacent ends of said front and rear sections for securing said sections together, a transverse division wall formed in the rear section, there being an opening in the top of said rear section a transmission shaft having one end thereof journaled in said transverse division wall, an integral flange formed on one of said sections a removable transverse plate secured to said flange and forming the forward support for the other end of said transmission shaft and for permitting the removal upwardly from said frame.

2. In a tractor, a main frame having a front and rear section, external flanges formed on the adjacent ends of each of said sections for securing said sections together, said sections having openings in the tops thereof, an internal flange formed on the rear section, a transverse division wall separating the rear section into two compartments, a main and a supplemental transmission shaft having their rear ends journaled in said division wall, and a removable plate secured to said internal flange forming the front bearing support for said main and supplemental transmission shafts and for permitting said shafts to be removed through said openings without disconnecting said frame sections.

3. In a tractor having a main frame, a removable assembly comprising a shaft, a bull pinion carried by said shaft, a flange formed integrally with said shaft, and a brake drum and beveled gear secured to the opposite sides of said flange.

4. In a tractor having a main frame, a removable assembly comprising a shaft, a bull pinion formed integrally with said shaft, a flange formed integrally with said shaft and common means for securing a brake drum and beveled gear to said flange.

5. In a tractor having a main frame, a removable assembly comprising a shaft mounted within said main frame, a bull pinion formed as an integral part of said shaft and a brake drum and beveled gear secured adjacent to each other and to said shaft and within said frame.

6. In a tractor comprising a frame, a transverse division wall dividing the rear portion of said frame into two compartments, there being an opening in the top of said frame adjacent one of said compartments, a transmission shaft having one end journaled in said division wall, and a removable plate secured to said frame and forming the support for the other end of said transmission shaft, whereby on the removal of said plate, said shaft may be removed through the opening in said frame.

7. In a tractor comprising a frame, a transverse division wall dividing the rear section of said frame into two compartments, there being an opening in the top of said frame adjacent one of said compartments, a circular flange formed on the inside of said frame, a transmission shaft having its rear end journaled in said division wall, and a removable plate secured to said circular flange forming the support for the forward end of said transmission shaft, whereby said shaft may be removed through said opening without disconnecting frame.

8. In a tractor, a main frame having a front section and a rear section, there being an opening in the top of said rear section, flanges formed on the adjacent ends of said front and rear sections for securing said sections together, a division wall in said rear frame section, a main shaft and a supplemental transmission shaft having their rear ends supported in said division wall, and a removable plate secured to said front frame section and forming the bearing support for the front ends of said main and supplemental transmission shafts and for permitting said shafts to be removed through said opening.

9. In a tractor, a frame comprising a front and rear section, means for securing the inner adjacent ends of said front and rear sections together, there being an opening in the top of said rear section, a transverse partition wall dividing the rear section into a transmission compartment and a brake drum compartment, a clutch housing formed in the rear end of said front frame section and a removable division wall dividing the clutch housing from the transmission compartment, whereby the transmission mechanism may be removed through said opening without separating the front and rear sections.

10. In a tractor, a main frame having front and rear frame sections, flanges formed on the adjacent ends of said front and rear frame sections for securing said sections together, there being an opening in said frame adjacent one of said sections, a flange formed on the inner side of one of said sections, a transverse division wall dividing the rear frame section into two compartments, a transmission shaft having one end thereof journaled in said division wall, and a removable plate secured to the inside flange forming the bearing support for the other end of said transmission shaft, said plate being removable to permit the removal of said transmission shaft through said opening without dismantling said frame sections.

11. In a tractor comprising a frame, a transverse division wall dividing the rear portion of said frame into two compartments, there being an opening in the top of said frame adjacent one of said compartments, a transverse annular flange formed on the inside of said frame, a transmission shaft having its rear end journaled in said division wall, and a removable circular plate secured to said annular flange forming the support for the forward end of said transmission shaft and for permitting said shaft to be removed through the opening in the top of said frame.

OTTO R. SCHOENROCK.